Nov. 19, 1963   E. A. STORCH   3,111,607
ELECTROMAGNET ASSEMBLY
Filed Feb. 29, 1960

INVENTOR.
EDWARD A. STORCH
BY
Barnes, Kisselle, Raisch & Choate
ATTORNEYS

United States Patent Office 3,111,607
Patented Nov. 19, 1963

3,111,607
ELECTROMAGNET ASSEMBLY
Edward August Storch, Detroit, Mich., assignor, by court order, to Ruth E. Storch
Filed Feb. 29, 1960, Ser. No. 11,623
6 Claims. (Cl. 317—123)

This invention relates to magnets and particularly to electromagnets.

In making parts from thin sheet metal panels, for example, where such panels are welded as in the automotive industry, it is essential that the panels be firmly gripped and held during the welding operation and at the same time be quickly released after the welding operation. Heretofore, clamps have been used to insure a proper holding of the metal panels. Obviously, the use of the clamps necessitates an expenditure of a great deal of time in the assembly and removal of the clamps. Permanent magnets have been used to a very limited extent but have the inherent disadvantage that they make the release of the panels difficult. Electromagnets have been used but usually such magnets utilize an excess of power and therefore are uneconomical.

It is an object of this invention to provide a combined permanent magnet and electromagnet assembly wherein the force of the permanent magnet is used to firmly hold and grip the thin metal panel in position for welding and the like and the electromagnet is used to oppose the force of the permanent magnet for releasing the thin metal panel.

It is a further object of the invention to provide such a combined permanent magnet and electromagnet assembly wherein the force of the electromagnet can be used to augment the force of the permanent magnet for facilitating the initial gripping and holding of the thin metal panel.

It is a further object of the invention to provide such a combined permanent magnet and electromagnet assembly which has the magnetic field thereof concentrated adjacent the metal contacting area thereby making it particularly efficient for gripping thin sheet metal panels.

It is a further object of the invention to provide such a combined permanent magnet and electromagnet assembly which has long life.

It is a further object of the invention to provide such a permanent magnet assembly which can be manufactured at relatively low cost.

Figure 1:
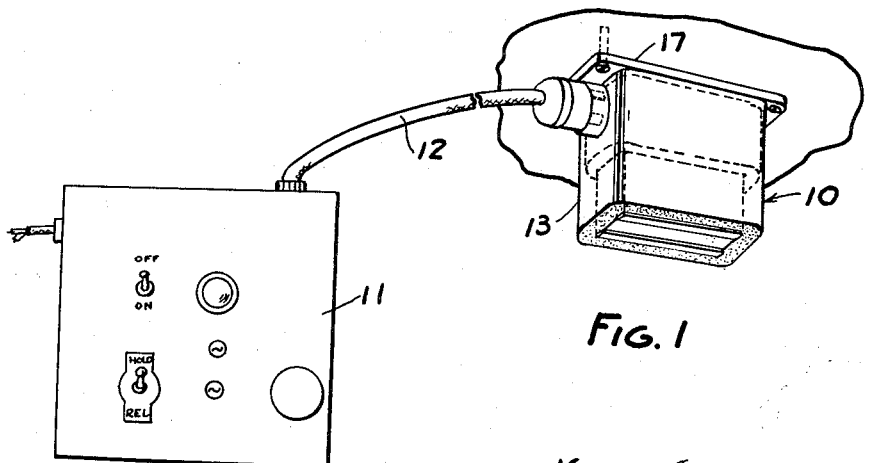
FIG. 1 is a perspective view of the combined permanent magnet and electromagnet assembly.
Figure 3:
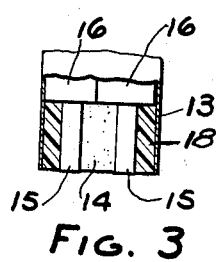
FIG. 3 is a sectional view taken along the line 3—3 in FIG. 1.
Figure 2:
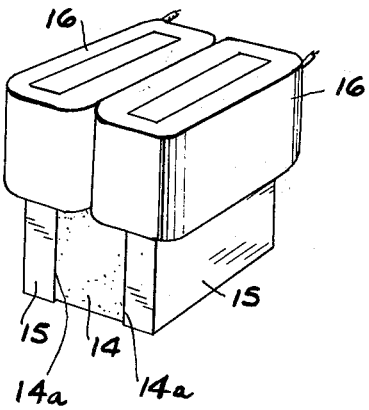
FIG. 2 is a perspective view of a portion of the combined permanent magnet and electromagnet assembly.

Referring to FIG. 1, the combined permanent magnet and electromagnet assembly 10 is adapted to be fastened to a support and electrically connected to a power source and control panel 11 by means of a cable 12. As shown in FIGS. 2 and 3, the combined permanent magnet and electromagnet assembly 10 comprises a rectangular outer casing 13 which may be made of nonmagnetic material and has the ends thereof open. A rectangular permanent magnet 14 of ceramic material is provided within the casing. The magnet 14 has the poles thereof at the opposed side faces 14a rather than at the ends as in conventional magnets. A pair of pole pieces 15 are provided within the casing with the sides of their lower ends in contact with the faces 14a of the magnet 14 and the other ends thereof projecting beyond the magnet 14. Coils 16 are wound around the free ends of the pole pieces 15 and plastic material fills the space between the casing 13 and the magnet 14 and pole pieces 15 thereby embedding the magnet 14 and pole pieces within the casing. A plate 17 of nonmagnetic material is fastened to the assembly closing the end of the casing opposite the magnet by means of screws 18 of nonmagnetic material.

The ends of pole pieces 15 preferably project beyond the end of the casing 13, magnet 14 and plastic, a slight distance on the order of one sixteenth of an inch.

According to the invention, permanent magnet 14 is made of a ceramic material. Such ceramic magnet materials comprise barium carbonate and iron oxide which are pressed under high pressures and thereafter sintered at high temperatures. A typical ceramic magnet material is that sold under the trade name Indox and made by The Indiana Steel Products Company of Valparaiso, Indiana.

The pole pieces 15 can be made of any type of steel or iron which has good magnetic properties. Casing 13 is preferably made of a nonmagnetic stainless steel while plate 17 can be made of aluminum or brass. The plastic material which embeds the magnet and pole pieces in position should be heat resistant. Epoxy resins produce satisfactory results.

Figure 4:
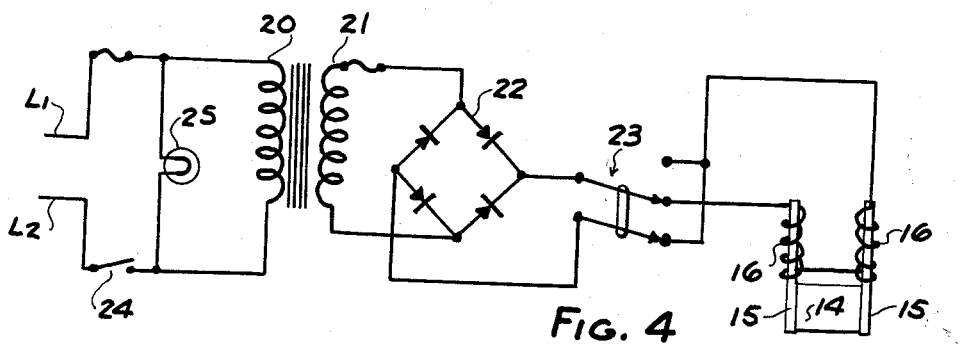
FIG. 4 is a diagrammatic wiring diagram of the electromagnet assembly.

The panel 11 provides the power to the coils of the electromagnet and may utilize a circuit such as shown in the electrical wiring diagram in FIG. 4 wherein power from leads $L_1$ and $L_2$ passes to the primary 20 of the transformer. The power from the secondary 21 of the transformer is directed to a rectifier 22 and thereafter through a double pole switch 23 to the coils 16 which are wrapped around the pole pieces 15. In one position of the switch 23, the field of the coil 16 is additive to the field of the permanent magnet 14 while in the other position the fields of the coils 16 are subtractive. An on-off switch 24 is provided in the circuit of the primary 20. In addition, a light 25 is provided in the transformer circuit to indicate when the magnet assembly is energized.

The combined permanent magnet and electromagnet assembly can be operated in various ways. For example, the assembly can be mounted on a movable support which is adapted to be brought into position for gripping and moving a sheet metal panel into position for welding or other operation. Alternatively, a plurality of assemblies may be provided on individual supports for gripping a single sheet metal panel and moving and holding it in position for the performance of one or more operations. In each instance, the panel is held in the desired position by the permanent magnet. When it is desired to release the panel the switch 24 is closed and switch 23 is placed in position so that the fields of the coils 16 oppose the field of the permanent magnet thereby releasing the metal panel. The switch 24 is then opened placing the combined magnet assembly in position for again gripping a thin sheet metal panel.

The combined permanent magnet and electromagnet assembly can also be used in a manner wherein the fields of the coils 16 assist the gripping action of the permanent magnet 14. For example, with the switch 23 in position so that the electromagnetic fields of the coils 16 are additive to the field of the permanent magnet 14, the switch 24 is actuated to energize the magnet assembly and thereby grip a sheet metal panel positioned adjacent the magnet assembly. After the panel has been gripped, the switch 24 may be opened to de-energize the coils 16 so that the panel is held by the permanent magnet only. When it is desired to release the panel, the switch 24 is again closed and switch 23 reversed so that the fields of the coils 16 oppose the field of the permanent magnet 14 and thereby releases the metal panel.

In the arrangement shown, the provision of the relatively thin pole pieces 15 of rectangular cross section compared with the rectangular cross section of the magnet 14 produces a magnetic field which has a limited depth of substantial cross sectional area which makes it particularly effective for gripping thin metal panels.

The use of a ceramic type magnet combined with the positioning of the coil 16 on the ends of the pole pieces 15 which are free and remote from the permanent magnet 14 prevents the de-magnetization of the permanent magnet 14 when the coils 16 are energized to oppose the field of the permanent magnet 14. In this manner, a long life of the combined permanent magnet and electromagnet assembly is assured without the necessity for re-magnetizing the permanent magnet.

Figure 5:
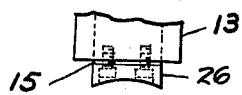
FIG. 5 is a fragmentary view of a modified form of the combined permanent magnet and electromagnet assembly.

The combined permanent magnet and electromagnet assembly can be used to handle panels of varying configurations other than flat by an arrangement such as shown in FIG. 5 wherein extensions 26 are provided on the ends of the pole pieces 15 adjacent the magnet 14 by fastening the extensions on the pole pieces with screws. The free ends of the extensions 26 are shaped to grip the object which is to be held in position.

It can thus be seen that I have provided a combined permanent magnet and electromagnet assembly which effectively grips thin metal objects and wherein the objects can be positively gripped, held and released as desired. The assembly is such that a periodic re-magnetization of the permanent magnet is not required.

The permanent magnet servies to grip and hold a thin sheet metal panel in position while the electromagnets can be energized to oppose the permanent magnet thereby releasing the gripping action on the metal panel.

The electromagnet forces of the coils may be added to the force of the permanent magnet to bring a thin sheet metal panel into gripping relationship with the permanent magnet and thereafter the electromagnet can be de-energized so that the permanent magnet holds the panel in position. In this manner, a saving in electrical energy is achieved since the electromagnet need not be energized during the normal holding of the sheet metal panel.

I claim:

1. A combined permanent magnet and electromagnet assembly for clamping a thin sheet metal panel comprising a casing of nonmagnetic material having an opening therein, a rectangular permanent magnet of ceramic material positioned within said casing, a pair of rectangular pole pieces each having a planar face adjacent one end thereof in contact with a pole of said magnet and positioned adjacent said opening in said casing, a coil wound around the other end of each said pole piece which extends beyond the confines of said magnet within said casing, and means for holding said magnet and pole pieces in position within said casing, the said one ends of said pole pieces which are adjacent said opening projecting outwardly with respect to the casing sufficiently to permit contact of the said one ends of said pole pieces with a workpiece which is to be gripped by said magnet assembly.

2. A combined permanent magnet and electromagnet assembly for clamping a thin sheet metal panel comprising a casing of nonmagnetic material having an opening therein, a rectangular permanent magnet of ceramic material positioned within said casing, a pair of rectangular pole pieces each having a planar face adjacent one end thereof in contact with a pole of said magnet and positioned adjacent said opening in said casing, a coil wound around the other end of each said pole piece which extends beyond the confines of said magnet within said casing and plastic material filling the space between said casing and said magnet and pole pieces thereby embedding said magnet and pole pieces in said casing, the said one ends of said pole pieces which are adjacent said opening projecting outwardly sufficiently to permit contact of the said one ends of said pole pieces with a workpiece which is to be gripped by said magnet assembly.

3. The combination set forth in claim 2 including means providing a direct current, and means for selectively connecting said latter means to said coils for adding or substracting the electromagnetic fields of the coils to the field of the permanent magnet.

4. A combined permanent magnet and electromagnet assembly for clamping a thin sheet metal panel comprising a casing of nonmagnetic material having an opening therein, a rectangular permanent magnet of ceramic material positioned within said casing, said magnet having a greater length than thickness, the poles of said magnet being at the surfaces defining said thickness, said magnet being positioned at said casing with the ends thereof defined by the length being axially aligned of said casing, a pair of rectangular pole pieces each having a planar face adjacent one end thereof in contact with a pole of said magnet and positioned adjacent said opening in said casing, a coil wound around the other end of each said pole piece which extends beyond the confines of said magnet within the casing, and plastic material filling the space between said casing and said magnet and pole pieces thereby embedding said magnet and pole pieces in said casing, the said one ends of said pole pieces which are adjacent said openings projecting outwardly sufficiently to permit contact of the said one ends of said pole pieces with a workpiece which is to be gripped by said magnet assembly.

5. The combination set forth in claim 1 including means for supplying a direct current to said coils and switching means for energizing said coils in such a manner that the magnetic field created by said coils is selectively additive and subtractive to the magnetic field of said permanent magnet.

6. A combined permanent magnet and electromagnet assembly for clamping a thin sheet metal panel comprising a casing of nonmagnetic material having an opening therein, a permanent magnet of ceramic material positioned within said casing, a pair of pole pieces each having a planar face adjacent one end thereof in contact with a pole of said magnet and positioned adjacent said opening in said casing, a coil wound around the other end of each said pole piece which extends beyond the confines of said magnet within said acsing, and means for holding said magnet and pole pieces in position within said casing, the said one ends of said pole pieces which are adjacent said opening projecting outwardly with respect to the casing sufficiently to permit contact of the said one ends of said pole pieces with a workpiece which is to be gripped by said magnet assembly.

References Cited in the file of this patent

UNITED STATES PATENTS

| | | |
|---|---|---|
| 2,347,170 | Brown et al. | Apr. 25, 1944 |
| 2,637,590 | Ortloff | May 5, 1953 |
| 2,888,290 | Pierce | May 26, 1959 |
| 2,928,029 | Norton | Mar. 8, 1960 |
| 3,014,751 | Smith | Dec. 26, 1961 |